Patented Dec. 24, 1935

2,025,675

UNITED STATES PATENT OFFICE 2,025,675

LIGHT SENSITIVE LAYERS

Oskar Süs, Wiesbaden-Biebrich, Germany, assignor to Kalle & Co. Aktiengesellschaft, Wiesbaden-Biebrich, Germany No Drawing. Application August 24, 1933, Serial No. 686,649. In Germany September 5, 1932

16 Claims. (Cl. 95—7)

The present invention relates to light-sensitive layers.

It is known that the light-sensitiveness of layers sensitized with organic iron salts may be increased by the addition of organic acids, as for instance, tartaric acid, oxalic acid or citric acid. Together with the light-sensitiveness, however, the decomposability of the layers is increased. Thus, oxalic acid yields the most light-sensitive but least stable layers.

Now I have found that unsaturated organic acids, such as for instance, maleic acid, fumaric acid, itaconic acid, furancarboxylic acid, pyromucic acid, etc., are capable of considerably increasing the light-sensitiveness of layers containing iron salts, without the stability being affected to a noticeable extent. The acids may be added to the known light-sensitive layers containing iron salts as free acids or in the form of their salts, alone or in mixture with the acids already used. As is known, other activators, for instance, fluorescin and gelatine may furthermore be incorporated into the layers. Finally combinations of iron salts with other metal salts, as for instance silver nitrate, in conjunction with unsaturated acids may be worked up into light-sensitive layers.

The following examples serve to illustrate the invention, the parts being by weight unless otherwise stated:

(1) 25 parts of ferriammonium citrate (green salt) and 9 parts of potassium ferricyanide are dissolved in 120 parts by volume of water and 1 part of maleic acid is added to the solution. On applying the solution onto paper or another suitable support and exposing the material thus obtained to light under a negative, dark blue prints are obtained after washing with water. The increase of the light-sensitiveness effected by the addition of maleic acid may be determined with the aid of a grey wedge photometer according to Eder and by comparison with a test paper made without the addition of an unsaturated carboxylic acid.

(2) 9 parts of potassium ferricyanide and 25 parts of ferriammonium citrate are dissolved in 120 parts by volume of water and 5 parts of pyromucic acid are added to the solution. The solution is applied on paper or another suitable support. The light-sensitive material thus obtained has a rather good sensitiveness to light.

(3) 10 parts of ferriammonium oxalate, 10 parts of potassium ferricyanide and 1 part of maleic acid are dissolved in 80 parts by volume of water. The solution is applied on paper as usual. The paper thus prepared has a better sensitiveness to light and, moreover, yields prints which are darker than those obtained with papers made without the addition of an unsaturated carboxylic acid.

(4) 9 parts of potassium ferricyanide and 25 parts of ferriammonium citrate are dissolved in 120 parts by volume of water and a mixture of 0.7 part of maleic acid and 0.3 part of tartaric acid is added to the solution. A light-sensitive material is prepared by means of this solution in the usual manner and prints are obtained therefrom in the manner described in Example 1.

(5) 45 parts of ferriammonium citrate, 18 parts of silver nitrate and 10 parts of maleic acid are dissolved in 250 parts by volume of water and the solution is applied on paper or the like. After exposing to light and developing the light-sensitive material thus prepared in the usual manner there are obtained pictures of a sepia-brown coloration.

All of the light-sensitive layers prepared according to the examples show a very good stability.

I claim:

1. Light-sensitive layers comprising in a mixture a light-sensitive ferric complex salt and an addition of an organic unsaturated acid selected from the group consisting of aliphatic and heterocyclic acids.

2. Light-sensitive layers comprising in a mixture a light-sensitive complex salt, formed from a ferric salt and an organic saturated acid, and an addition of an organic unsaturated acid selected from the group consisting of aliphatic and heterocyclic acids.

3. Light-sensitive layers comprising in a mixture a light-sensitive ferric complex salt and an addition of an aliphatic unsaturated acid.

4. Light-sensitive layers comprising in a mixture a light-sensitive complex salt, formed from a ferric salt and an organic saturated acid, and an addition of an aliphatic unsaturated acid.

5. Light-sensitive layers comprising in a mixture a light-sensitive complex salt, formed from a ferric salt and an aliphatic saturated acid, and an addition of an aliphatic unsaturated acid.

6. Light-sensitive layers comprising in a mixture a light-sensitive ferric complex salt and an addition of an aliphatic unsaturated polycarboxylic acid.

7. Light-sensitive layers comprising in a mixture a light-sensitive complex salt, formed from a ferric salt and an organic saturated acid, and an addition of an aliphatic unsaturated polycarboxylic acid.

8. Light-sensitive layers comprising in a mixture a light-sensitive complex salt, formed from a ferric salt and an aliphatic saturated acid, and an addition of an aliphatic unsaturated polycarboxylic acid.

9. Light-sensitive layers comprising in a mixture potassium ferricyanide, a light-sensitive complex salt, formed from a ferric salt and an aliphatic saturated acid, and an addition of an aliphatic unsaturated acid.

10. Light-sensitive layers comprising in a mixture potassium ferricyanide, a light-sensitive complex salt, formed from a ferric salt and an aliphatic saturated acid, and an addition of an aliphatic unsaturated polycarboxylic acid.

11. Light-sensitive layers comprising in a mixture silver nitrate, a light-sensitive complex salt, formed from a ferric salt and an aliphatic saturated acid, and an addition of an aliphatic unsaturated acid.

12. Light-sensitive layers comprising in a mixture a light-sensitive ferric complex salt and an addition of maleic acid.

13. Light-sensitive layers comprising in a mixture a light-sensitive complex salt, formed from a ferric salt and an aliphatic saturated acid, and an addition of maleic acid.

14. Light-sensitive layers comprising in a mixture potassium ferri-cyanide, ferri-ammonium citrate and an addition of free maleic acid.

15. Light-sensitive layers comprising in a mixture potassium ferri-cyanide, ferri-ammonium oxalate and an addition of free maleic acid.

16. Light-sensitive layers comprising in a mixture silver nitrate, ferri-ammonium citrate and an addition of free maleic acid.

OSKAR SÜS.